United States Patent [19]

McNeely

[11] 3,859,249

[45] Jan. 7, 1975

[54] PROCESS FOR MANUFACTURE OF FLAME RETARDANT POLYESTER

[75] Inventor: Gerald Willard McNeely, Arden, N.C.

[73] Assignee: Akzona Incorporated, Ashville, N.C.

[22] Filed: Dec. 7, 1972

[21] Appl. No.: 313,052

[52] U.S. Cl.... 260/45.9 NP, 260/45.8 R, 260/75 N, 260/75 P, 260/75 T
[51] Int. Cl............................................. C09k 3/28
[58] Field of Search ........ 260/45.9 W, 75 N, 551 P, 260/927 N, 45.9 NP, 75 T; 252/8.1

[56] References Cited
UNITED STATES PATENTS

| 2,853,517 | 9/1958 | Fitzgerald et al. | 260/551 |
|---|---|---|---|
| 3,280,222 | 10/1966 | Kober et al. | 260/927 |
| 3,316,330 | 4/1967 | Nichols | 260/927 |
| 3,322,859 | 5/1967 | Sherr et al. | 260/893 |
| 3,356,769 | 12/1967 | Allcock | 260/927 |
| 3,392,214 | 7/1968 | Jaszka | 260/927 |
| 3,446,763 | 5/1969 | Okuzumi | 260/22 |
| 3,450,799 | 6/1969 | Kober et al. | 260/927 |
| 3,505,087 | 4/1970 | Godfrey | 106/15 |
| 3,624,024 | 11/1971 | Caldwell et al. | 260/40 |
| 3,629,365 | 12/1971 | Gardner | 260/857 |
| 3,792,117 | 2/1974 | Kolodchin et al. | 260/864 |

Primary Examiner—Donald E. Czaja
Assistant Examiner—R. A. White
Attorney, Agent, or Firm—Francis W. Young; Jack H. Hall

[57] ABSTRACT

Polyester is made flame retardant by incorporating therein flame retardants, such as cyclophosphazene additives, prior to polycondensation, at ester interchange and in an amount of from about 1 percent to about 20 percent by weight; a preferred range is from 5 to 15 percent.

4 Claims, No Drawings

PROCESS FOR MANUFACTURE OF FLAME RETARDANT POLYESTER

BACKGROUND OF THE INVENTION

It has been known to utilize various phosphorous containing materials as modifying additives to polyester to render same flame retardant. However, it is essential that any such modified polyester, that is to be processed into fiber and/or filament, be acceptably processable as a synthetic fiber or filament through a full end use denier range; it must be also readily dyeable by the conventional dyeing procedures of the trade. Polyester staple, filament, yarn, fiber, and sheets thereof, can be effectively flame retarded in the practice of this invention.

PRIOR ART

The preparation and characterization of the phosphazene additives and chemistry that can be used or adapted for use in the practice of this invention is presented in, for example *Chemical and Engineering News*, Apr. 22, 1968, pages 68–81 (H. R. Allcock) and U.S. Pat. No. 3,304,350. The preparation of certain organophosphorous polymers and their use as flame retardants is set forth in the following representative prior art: U.S. Pat. Nos. 2,891,915; 3,193,397; 3,322,850; British Pat. No. 1,208,748; the J.A.C.S., Vol. 84, page 55 (1962); *Chemical Reviews*, Vol. 62, pages 247–281 (1962); the J.A.C.S., Vol. 80, page 2116 (1958); and *Inorganic Chemistry* 3, pages 429 and 594 (1964).

DESCRIPTION OF THE INVENTION

Polyester polymer and copolyesters, as more fully described herein, are made flame retardant by incorporating therein flame retardant additives, such as phosphazene phenyl and phenoxy derivatives at the start of ester interchange as hereinafter described, prior to, for example, polycondensation and conventional melt spinning. These selected additives reflect sufficient thermal stability on use and impart flame retardant properties to polyester polymer in the practice of this invention.

Specific cyclophosphazene phenyl and phenoxy derivatives that can be utilized in polyester polymer to impart flame retardant properties thereto include the following:

A. 2,4,6,8-tetraphenyl-2,4,6,8-tetrakis (2,2,2-trifluoroethoxy)cyclotetraphosphazene

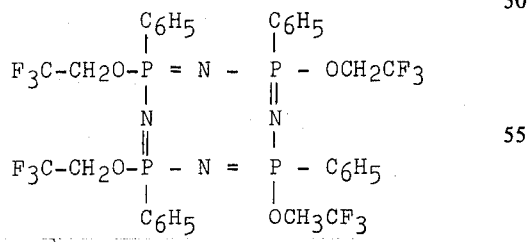

B. Hexaphenoxycyclotriphosphazene

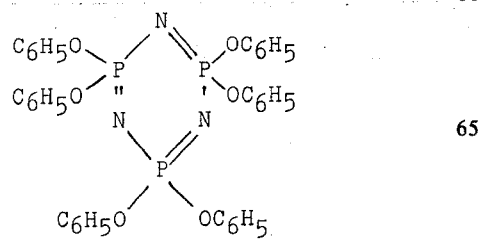

C. Hexaphenylcyclotriphosphazene

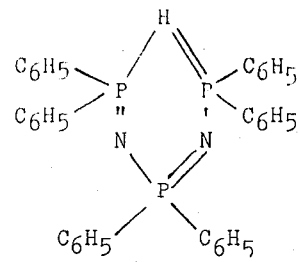

D. Octaphenylcyclotetraphosphazene

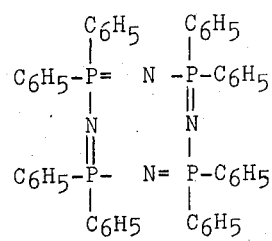

E. Tris(2,2'-dioxybiphenyl)cyclotriphosphazene

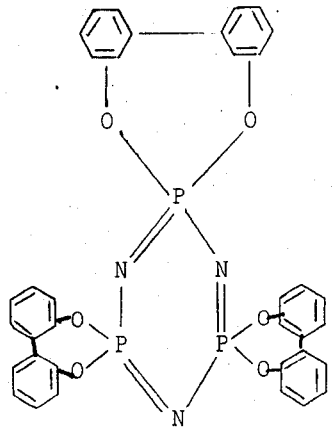

F. 2,4,6,8-tetraphenyl-2,4,6,8-tetraphenoxycyclotetraphosphazene

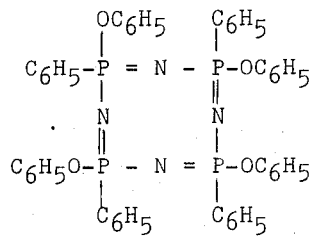

G. Octaphenoxycyclotetraphosphazene

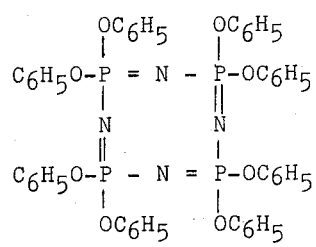

Any such cyclophosphazene phenyl and phenoxy derivatives such as those specifically set forth above, which derivatives are incorporated into the polyester polymer in an amount from about 1 to about 20 percent by weight, can be substituted in the representative examples that follow to achieve essentially the same results with a minimum of routine experimentation as would be readily undertaken, if necessary, by one skilled in the art.

These particular cyclophosphazene flame retardant additives can be generically defined and characterized as follows: thermal and chemically stable phenyl or phenoxy derivatives of cyclotri- and cyclotetraphosphazenes as flame retardant for polyester, said thermal and chemical stability being maintained at temperatures up to about 300° C. Any such cyclophosphazene meeting the preceding definition as interpreted by one skilled in the art would perform in substantially the same manner as those herein specifically exemplified.

The flame retarded polyester or copolyester produced in accordance with this invention can be satisfactorily processed in the trade, for example, successfully deep dyed by conventional dyeing procedures from an aqueous system without the use of a carrier or with the use of a lesser amount of carrier. The variety of polyester, dyes, or mixtures thereof that can be utilized is wide in scope and depends on processing conditions and desired results, all within the realm of routine experimentation.

In the practice of the present invention, conventional additives can be incorporated prior to spinning to achieve a desired result; such additives include dyeing additives, anti-oxidants, stabilizers, delustrants, etc., singularly, or in combination.

The flame retardant additive component of the present invention will be incorporated by mixing at the start of ester interchange and prior to polycondensation and extrusion or spinning. This control enables the avoidance of the problem resulting when certain such additives, introduced during polymerization, would normally adversely affect the processing of and/or degrade the resulting polymer. It is submitted that the results achieved represent a significant contribution to the art in providing, for example, synthetic organic polyester filaments that can be readily processed, which filaments are flame retarded and can be subsequently handled within the skill of the art to produce desired dye fabrics and carpeting. These end use products are flame retardant as more specifically herein described. Staple, film, and sheets of flame retarded polyester can be produced.

The polyesters employed in practicing this invention include those which are well-known in the art as exemplified by U.S. Pat. Nos. 2,465,319; 2,901,466; 2,744,089; and 3,018,262. It is to be understood that the term "polyester" includes both homopolyesters and copolyesters.

In incorporating the flame retardant additive components at the start of ester interchange, known means which will achieve a thorough mixing can be utilized. It is essential that moisture be reduced to an absolute minimum in the polymer, the additives separately or at a temperature below the melting point of any one of the components. The time required for effective drying to reduce moisture content can, of course, be routinely determined. Mechanical mixing will normally be utilized followed by spinning to produce flame retarded commercially accepted filaments. Flame retardant polymeric films or sheets can also be produced.

Typical polyesters which can be modified in the practice of the present invention include those set forth in U.S. Pat. Nos. 2,465,319; 2,437,232; 2,739,957; and 2,895,946. Various processes which can be utilized to prepare such polyesters are set forth, for example, in U.S. Pat. Nos. 3,433,770 and 3,406,152, the latter patent also disclosing the addition of additives to control pilling.

Copolyester can be prepared from terephthalic acid or an ester forming derivative thereof and a glycol of the formula $HO(CH_2)_nOH$, wherein $n$ is an integer of from 2 to about 10, in the presence of a dye sensitizing sulfonate containing compound, a branching agent, such as glycerol, and a dye dispersing and dye retaining aliphatic diacid or ester thereof. The particular copolyester, sulfonate containing additive, branching agent, and aliphatic diacid (or ester thereof) selected singularly or in combination, is not critical.

Polyesters and copolyesters which can be modified in the practice of this invention are well-known in the art and include those of U.S. Pat. No. 3,018,272; this disclosure also sets forth sulfonate group containing compounds which can be utilized in the practice of the present invention. U.S Pat. No. 3,096,358 sets forth additional sulfonate compounds which can be utilized in conjunction with a selected aliphatic diacid of the formula:

$$HOOC(CH)_nCOOH$$

$n$ having a value of from 2 to 18. Preferred species aliphatic diacid additives are the azelate and adipate diacids and ester derivatives thereof.

Branching agents which can be utilized include hexanetriol; pentaerythritol; trimethylolpropane, sorbitol; trimethylol ethane; glycerol; trimethylol benzene-1,3,5; tripropylol benzene-1,3,5; tributylol benzene-1,3,5; trihexylol benzene-1,2,6; trimethyl trimesate; triethyl trimesate; tripropyl trimesate; tetramethyl pyromellitate; tetramethyl mellophanate; trimethyl hemimellitate; trimethyl trimellitate and tetramethyl prehnitate.

Examples of sulfonate group containing compounds which can be utilized include metallic salts of sulfomonocarboxylic esters, sulfodicarboxylic esters, monohydric and dihydricalcohols containing at least one sulfonic acid group and monohydric alcohols containing one carboxylic ester group and at least one sulfonic acid group.

Among the basic and disperse dyestuffs which readily dye the fibers produced from the flame retarded polyester of this invention are the "Genacryl" and "Celliton" dyes discussed on pages 432 to 433 of the American Dyestuff Reporter, Volume 43, 1954, for example, Genacryl Red 6B (a basic dye of quaternary ammonium type), Genacryl Pink G. (Basic Red 13, Color Index 48015), Genacryl Blue 6G; Celliton Fast Red GOA Ex. Cone (Disperse Red 17; Color Index No. 11210); Celliton Fast Blue AF Ex. Cone (Color Index No. 61115); Fuchsine SBP (a basic dye of the triphenylmethane type); Fuchsine Conc. Basic Violet 14 (Color Index No. 12510); Methyl Violet 2B; Brilliant Blue 6G; Methylene Blue SP; Victoria Green WB (Color Index 657); Victoria Green (Basic Green 4; Color Index No. 42000); Rhodamine B (Color Index 749); Brilliant Green B (Color Index 662); Sevron Brilliant Red 4G; Maxilon Red BL; Basacryl Blue GL; and the like.

Additional specific dyestuffs which can be utilized include the following:

| Dyestuff | Color Index Name |
|---|---|
| Sevron Yellow R | Basic Yellow 11. |
| Astrazon Yellow 7GLL | Basic Yellow 21. |
| Sevron Orange G | Basic Orange 21. |
| Maxilon Red BL | Basic Red 22. |
| Astrazon Red BBL | Basic Red 23. |
| Astrazon Red RL | Basic Red 25. |
| Sevron Red GL | Basic Red 18. |
| Sevron Blue ER | Basic Blue. |
| Sevron Blue 5G | Basic Blue 4. |
| Sevron Blue BGL | Basic Blue 35. |
| Sevron Blue NF | Basic Blue. |
| Resolin Blue FBLD | Disperse Blue 56. |
| Sevron Brilliant Red D | Basic Red 19. |

PREFERRED EMBODIMENT

In the preferred embodiment of the invention process from 5 to about 15 weight percent hexaphenoxycyclotriphosphazene is added at the start of ester interchange and prior to polycondensation, and, for example, extrusion.

The significant and unexpected increase in LOI ($\triangleleft$ LOI) achieved in the practice of this invention can be related, at least in part, to the chemical and thermal stability of the phosphazene additives and their addition at the start of ester interchange to achieve a more effective mixing without breakdown of additive and without polymer degradation. Although the exact theory as to the achievement of these unexpected results is not known, the positive results achieved represent a technical contribution to the art. The comparative examples with addition of phosphazene additive at end of ester interchange and during polycondensation prior to melt spinning clearly establishes a significant and unexpected increase in $\triangleleft$ LOI.

The following examples are representative and illustrate the significant utility and novelty of the present invention. The embodiments which follow are preferred and illustrate the herein described and claimed invention but are not to be construed as limiting the scope thereof.

EXAMPLE I

Ester interchange and polycondensation procedures were routinely conducted as follows:

A. Ethylene glycol and dimethylterephthalate in a molar ratio of approximately 2.5 to 1 based on the weight of dimethylterephthalate and 10 weight percent hexaphenoxycyclotriphosphazene additive were placed in a stirred reactor. An ester interchange catalyst, manganese acetate, in a molar ratio of 0.03 – 0.05 was added. The vessel was purged with nitrogen gas and then heated gradually to 215° – 220° C. for 1½ to 4 hours.

During this time, methanol distilled from the reaction mixture and was collected. When the theoretical amount of methanol had been collected, the prepolymer was heated for a few minutes at 215° – 220° C. to insure complete reaction. For comparison, 10 weight percent of said phosphazene additive was added at the end of ester interchange (see (b) of Table 1).

B. The prepolymer of (A) was then mixed with the polycondensation catalyst antimony oxide. This catalyst promotes the formation of high molecular weight polyesters. A phosphorus containing stabilizer such as trimethylphosphate can also be added at this time. The vessel is flushed with nitrogen gas and heated to 280° C. with stirring. The pressure was gradually reduced to 0.2 – 0.5 mm. of mercury. After 1½ to 3 hours, the vacuum was broken by admitting nitrogen gas and the polyester polymer allowed to cool. The polymer was then ground, dried and spun into 30/6 yarn. Two strands of this yarn were plied with one strand of 100 denier glass yarn and fabric knitted from the yarn. "Limiting oxygen index" values were then determined. The results are listed in Table 1.

Table 1

| Wt. % Hexaphenoxycyclotriphosphazene | LOI | $\triangleleft$ LOI |
|---|---|---|
| (a) 10.0 | 0.290 | 0.068 |
| (b) 10.0 | 0.255 | 0.033 |

The "Limiting oxygen index" (LOI) is a method developed recently to measure the flammability of bulk polymers by C. P. Fenimore and F. J. Martin. (Modern Plastics, 45, No. 15, 141, 146, 148, 192, Nov., 1966). The method was later adapted to measure the flammability of textiles by G. C. Tesoro and C. H. Meiser, Jr. (Textile Res. J. 40, 430 – 436, May, 1970). The method provides a measure of the minimal volume fraction of oxygen in a slowly rising gaseous atmosphere capable of sustaining candlelike burning of the sample. For most materials, this value is independent of the physical form and dimensions of the sample over a broad range. In the present examples, the test was modified so that it would be applicable to thermoplastic fibers, such as polyester, which ordinarily tend to melt and drip when burned. In the present LOI tests, the polyester yarn is plied with 100 denier glass yarn and then knitted into test fabric. A very good and reproducible measure of the effectiveness of a fire retardant additive can be obtained by noting the increase in the LOI value of the sample over that of the control containing no fire retardant. This increase is referred to as the $\triangleleft$ LOI.

EXAMPLE 2

The process described in Example 1 was repeated on a pilot plant scale with 10 weight percent hexaphenoxycyclotriphosphazene being added at the beginning of ester interchange to give a polymer with an I.V. of 0.67 and containing 8.7% flame retardant based on the phosphorus analysis.

The polymer was spun into yarn (1200/68); one strand of this yarn was plied with one strand of 100 denier glass yarn and woven into fabric. LOI values were determined on the fabric and a $\triangleleft$ LOI value of 0.037 was obtained. The yarn was bulked and tufted into 26 oz./yd.$^2$ shag carpet having a 1¾ inch pile height. This carpet was dyed with disperse dye using no carrier, Carolid 3F and Dysyn 813 carriers. The Carolid 3F carrier consists of 90 percent biphenyl and 10 percent non-ionic emulsifier; it is supplied by Tantex Chemical Company.

The Dysyn 813 carrier is a self emulsifiable solvent carrier consisting predominantly of methyl naphthalene; it is available from Apex Chemical Company. The particular carrier selected is not critical and can be routinely varied. Dye uptake in each case was greater than that of the control and the dye lightfastness was equal to that of the control. Samples of the carpet were tested according to the Department of Commerce Standard tilted "The Surface Flammability of Carpets and Rugs, (Pill Test)," DOC-FF1-70. The results of this test are shown in Table 2.

Table 2

Pill Test Results of Carpet Containing 8.7% Hexaphenoxycyclotriphosphazene

| Carrier | Dyed | | Dyed and Washed 10 Times | | Dyed and Shampooed 10 Times | |
|---|---|---|---|---|---|---|
| | No. Passing | No. Tested | No. Passing | No. Tested | No. Passing | No. Tested |
| Dysyn* | 8 | 8 | 8 | 8 | 7 | 8 |
| Carolid* | 8 | 8 | 7 | 8 | 8 | 8 |
| None | 7 | 8 | 7 | 8 | 6 | 6 |
| Dysyn* | Not Tested | | 6 | 6 | 6 | 6 |
| Carolid* | Not Tested | | 6 | 5 | 6 | 6 |

*Double backed

Carpets of the same construction prepared from yarn of the same denier containing no phosphazene consistently failed the pill test.

EXAMPLE 3

(For Comparison)

The procedure described in Example 1 was repeated substituting octaphenoxycyclotetraphosphazene for the hexaphenoxycyclotriphosphazene added at the end of ester interchange. Yarn (30/6) was spun and plied with glass. LOI values were then determined on the knit fabric. An LOI of 0.255 and a $\triangleleft$ LOI of 0.033 were found. The fabric was dyed along with a control with 1 percent Foron Navy S-2GL* (C. I. Blue 79) and 1 percent Resolin Blue FBLD* (C. I. Disperse Blue 56).

The dye uptake was equal to or better than the control. The slight stability for the Resolin Blue was equal to the control and that of the Foron Navy S-2GL was almost as good as the control. When a lighted match was applied to the yarn and removed, the yarn was self-extinguishing (i.e., a match test rating of 1). This is referred to subsequently as the "match test."

EXAMPLE 4

(For Comparison)

Three hundred grams of polyethylene terephthalate chips made by standard pilot plant procedure using techniques known to those skilled in the art, were placed in a resin kettle. The resin kettle was equipped with heater and stirrer and a bleed tube for nitrogen gas. The resin kettle was flushed thoroughly with nitrogen gas and then heated to 280° C. to melt the polyester chips. Hexaphenylcyclotriphosphazene was then added and the mixture was stirred for a few minutes to mix the additive with the molten polyester. The polymer was then spun into 30/6 yarn. The procedure was repeated several times to produce yarn containing 4, 5, 6, 8, and 10 weight percent of additive.

Three ends of yarn were plied with 100 denier glass fiber and knitted into fabric. LOI tests were then run on the knitted fabric. These are reported also in Table 4.

Table 4

| % Hexaphenylcyclotriphosphazene | I.V. | Yarn (30/6) LOI | LOI |
|---|---|---|---|
| 5.0 | 0.45 | 0.224 | 0.011 |
| 6.0 | 0.41 | 0.235 | 0.022 |
| 8.0 | 0.41 | 0.239 | 0.026 |
| 0.0 | | 0.213 | 0.000 |

Match test ratings, when utilized in the present examples, are as follows:
1. Would not burn without support flame from match.
2. Self-extinguishing within 5 seconds after removal of the match.
3. Burned longer than 5 seconds after removal of the match.

It is understood that the preceding representative examples can be varied within the scope of this total specification disclosure as it would be understood and practiced by one skilled in the art within a minimum of routine experimentation.

What is claimed is:

1. In the process of preparing polyester polymer by ester interchange and polycondensation, the improvement wherein flame retarded polyester polymer is prepared by adding from 1 to 20 percent by weight of a thermally and chemically stable cyclophosphazene derivative at the beginning of ester interchange, said derivative being selected from the group consisting of cyclotri- and cyclotetraphosphazene having, respectively, 6 or 8 substituents thereon selected from the group consisting of phenyl or phenoxy said cyclophosphazene derivative being thermally and chemically stable at temperatures up to about 300° C.

2. Process according to claim 1 wherein said cyclophosphazene is added in an amount of from about 5 to about 15 weight percent.

3. In the process of preparing polyester polymer by ester interchange and polycondensation, the improvement wherein flame retarded polyester polymer is prepared by adding from 1 to 20 percent by weight hexaphenoxycyclotriphosphazene as flame retardant additive at the beginning of ester interchange.

4. A process according to claim 3 wherein said hexaphenoxycyclotriphosphazene flame retardant is added in an amount from 5 to 15 percent by weight.

* * * * *